(12) United States Patent
Luca et al.

(10) Patent No.: US 11,918,010 B2
(45) Date of Patent: Mar. 5, 2024

(54) SYSTEMS AND METHODS FOR DEFROSTING FROZEN CARBONATED BEVERAGE SYSTEMS

(71) Applicant: Marmon Foodservice Technologies, Inc., Osseo, MN (US)

(72) Inventors: Ilie Luca, Carol Stream, IL (US); Jacob C. Greenberg, Elgin, IL (US); Tomasz K. Kasprzycki, Carpentersville, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 0 days.

(21) Appl. No.: 18/091,974

(22) Filed: Dec. 30, 2022

(65) Prior Publication Data
US 2023/0135547 A1    May 4, 2023

Related U.S. Application Data

(63) Continuation of application No. 16/818,082, filed on Mar. 13, 2020, now Pat. No. 11,571,006.

(60) Provisional application No. 62/819,024, filed on Mar. 15, 2019.

(51) Int. Cl.
*A23G 9/28* (2006.01)
*A23G 9/04* (2006.01)
*A23G 9/22* (2006.01)

(52) U.S. Cl.
CPC ............... *A23G 9/28* (2013.01); *A23G 9/045* (2013.01); *A23G 9/224* (2013.01); *A23G 9/222* (2013.01)

(58) Field of Classification Search
CPC .......... A23G 9/28; A23G 9/045; A23G 9/224; A23G 9/222; A23G 9/281
See application file for complete search history.

(56) References Cited

U.S. PATENT DOCUMENTS

| | | | |
|---|---|---|---|
| 2014/0263415 A1* | 9/2014 | San Miguel | A23G 9/283 222/1 |
| 2016/0366906 A1* | 12/2016 | Geng | B01F 35/221422 |
| 2018/0098553 A1* | 4/2018 | Cocchi | A23G 9/222 |
| 2021/0186049 A1* | 6/2021 | Ait Bouziad | A23G 9/224 |

* cited by examiner

*Primary Examiner* — Miguel A Diaz
(74) *Attorney, Agent, or Firm* — Andrus Intellectual Property Law, LLP

(57) ABSTRACT

A system for dispensing a frozen beverage. The system includes a barrel having an inner wall and being configured to retain the frozen beverage therein. A mixing system causes mixing of the frozen beverage within the barrel. A cooling system cools the frozen beverage from radially outwardly of the inner wall. A melting system heats the frozen beverage from radially inwardly of the inner wall. The mixing system causes relatively larger ice crystals to move inwardly from the inner wall, and the melting system reduces a size of the relatively larger ice crystals.

20 Claims, 10 Drawing Sheets

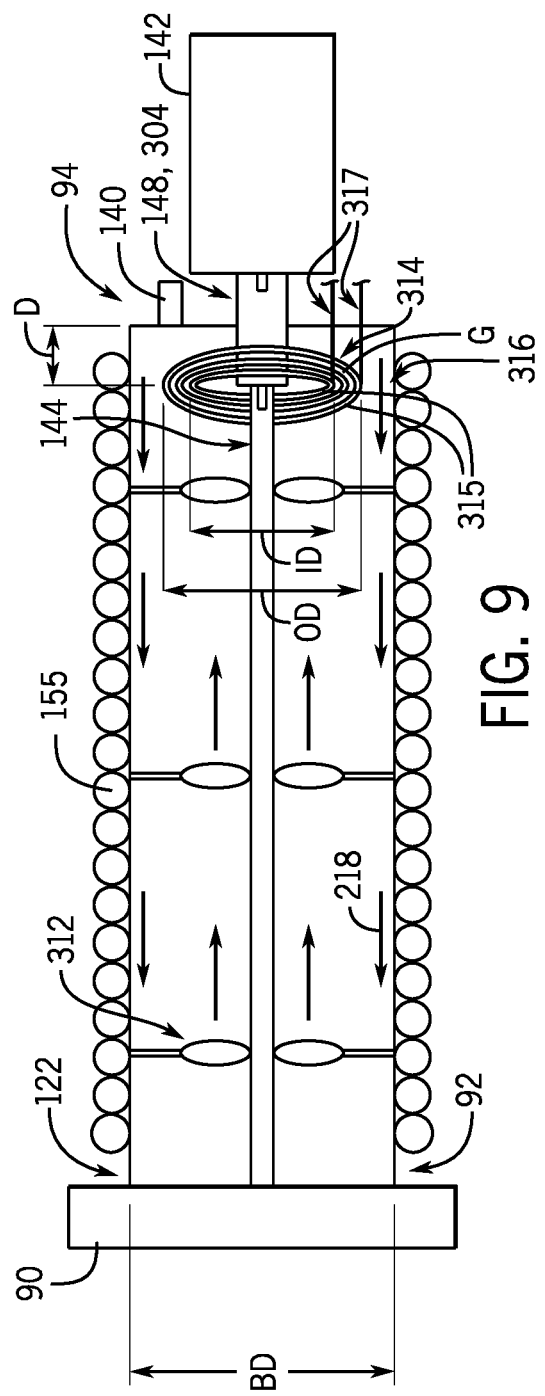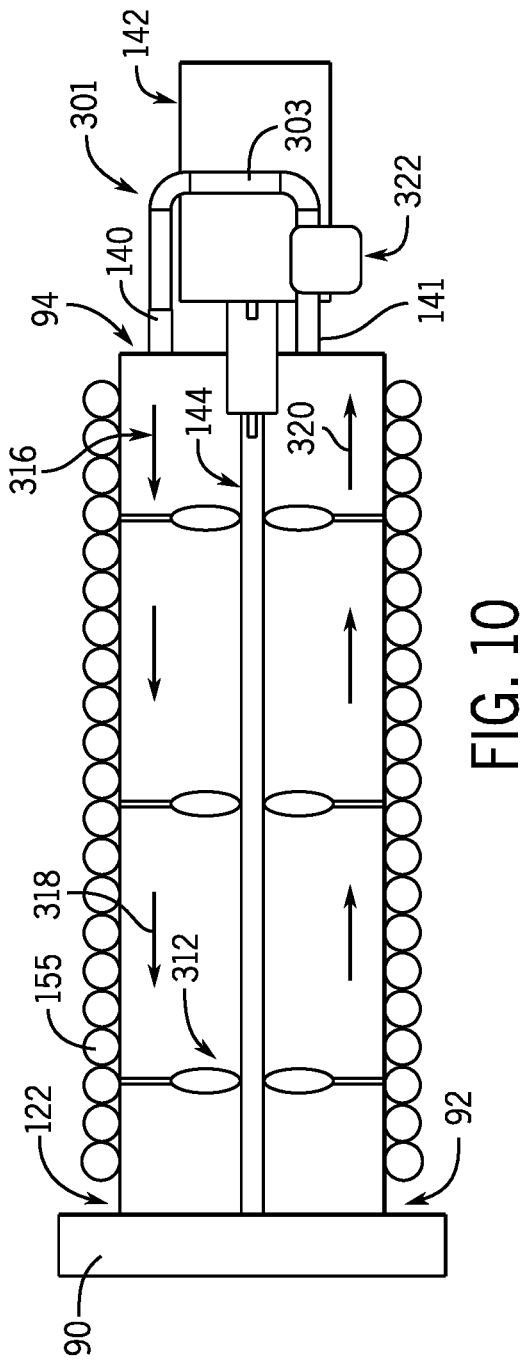

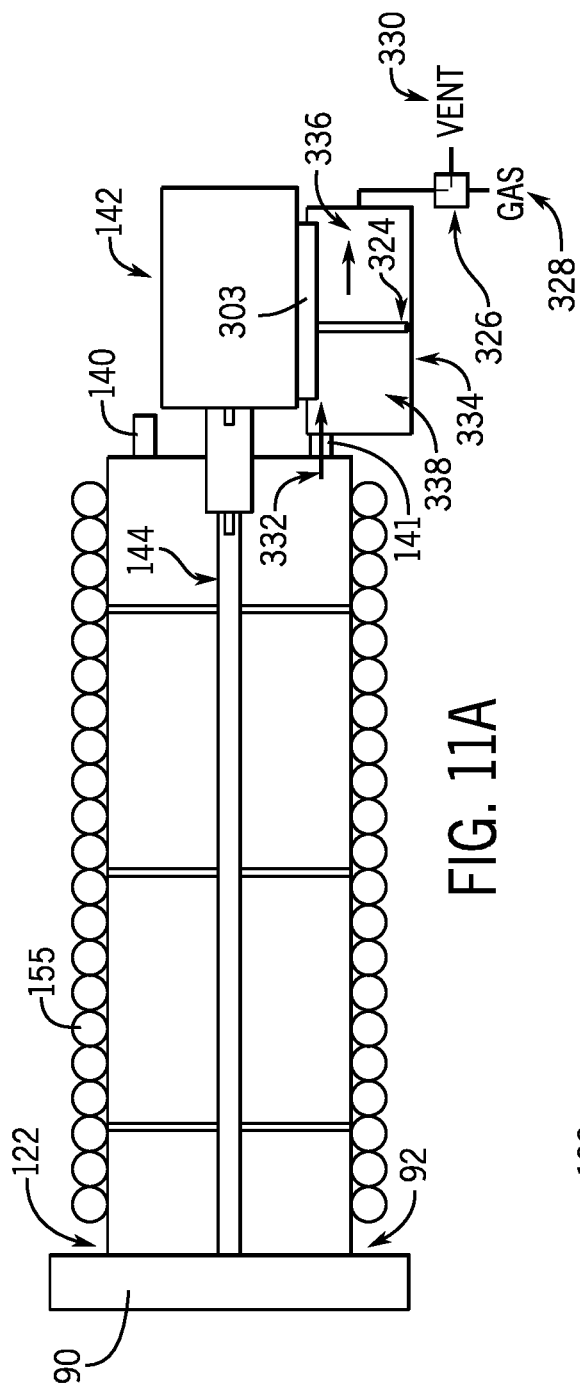
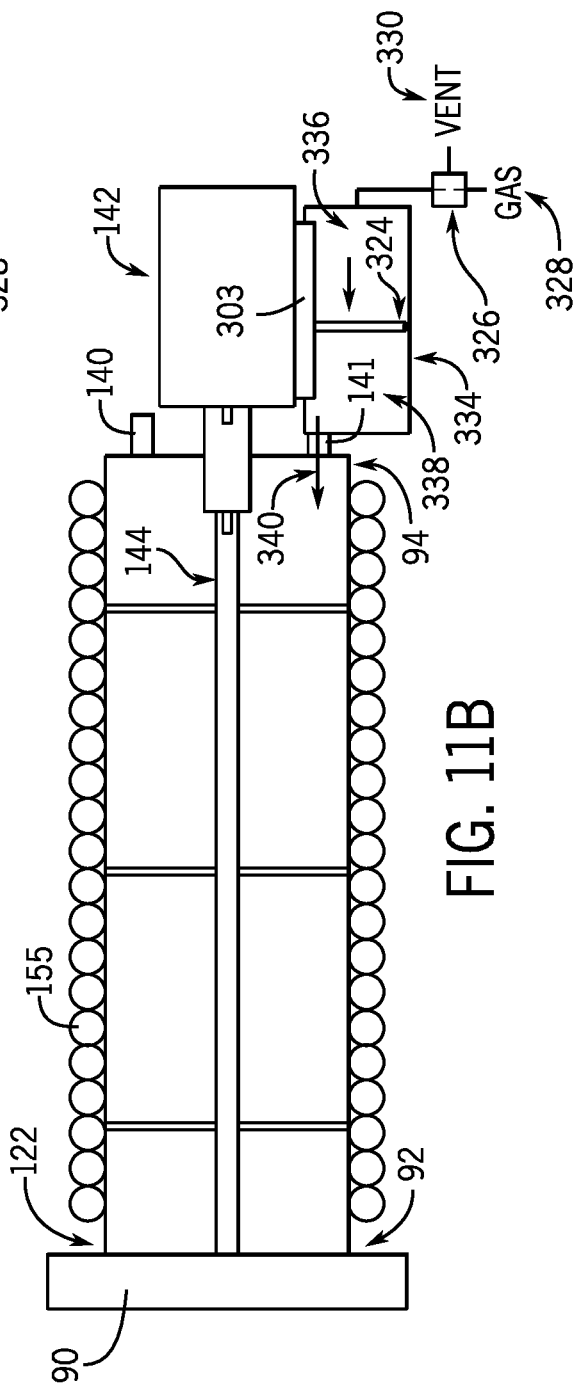
FIG. 11A
FIG. 11B

SYSTEMS AND METHODS FOR DEFROSTING FROZEN CARBONATED BEVERAGE SYSTEMS

CROSS REFERENCE TO RELATED APPLICATION

This application is a continuation of U.S. patent application Ser. No. 16/818,082, filed Mar. 13, 2020, which is incorporated herein by reference in its entirety.

FIELD

The present disclosure generally relates to frozen carbonated beverage systems, and more particularly to systems and methods for defrosting frozen carbonated beverage systems.

BACKGROUND

The Background and Summary are provided to introduce a foundation and selection of concepts that are further described below in the Detailed Description. The Background and Summary are not intended to identify key or essential features of the potentially claimed subject matter, nor are they intended to be used as an aid in limiting the scope of the potentially claimed subject matter.

The following U.S. Pat. and Patent Applications are incorporated herein by reference:

U.S. Pat. No. 5,103,649 discloses improvements in the electronic control of frozen carbonated beverage machines and defrost heaters therein. A control scheme is shown that provides for accurately determining the viscosity of a semi-frozen beverage as a function of the torque of a drive motor. The viscosity scale has a zero value when the beverage is known to be completely liquid. Viscosity is maintained within a narrow range based upon pre-defined three level low, medium and high viscosity sets, and wherein compressor short-cycling is eliminated.

U.S. Pat. No. 6,220,047 discloses a dual purpose carbonator/blending bottle connected to a source of beverage syrup, a source of potable water and to a source of pressurized carbon dioxide gas. The dual purpose bottle is retained within an ice bank water bath tank. A pair of ratio valves provide for metering the water and syrup at a desired ratio. A refrigeration system provides for cooling an evaporator located in the water tank for forming the ice bank thereon. The carbonated beverage then flows from the bottle into a freeze cylinder. A scraping mechanism within the cylinder provides for scraping frozen beverage from the inner surface of the cylinder. A control mechanism provides for controlling the refrigeration system and the cooling of both evaporators.

U.S. Pat. No. 6,830,239 discloses a carbonator tank that includes a liquid inlet, a gas inlet and a liquid outlet. A liquid level sensor includes a liquid level sensing portion extending along and within the interior of the carbonator and provides for determining a full and minimal liquid level therein. The liquid then flows into the carbonator interior and contacts a deflection plate and is deflected thereby so that such liquid flow does not disrupt the operation of the level sensing portion of the level sensor.

U.S. Pat. No. 5,212,954 discloses improvements in electric defrost heaters used in frozen carbonated beverage machines. The frozen carbonated beverage machine includes freeze cylinders used to produce the frozen beverage. One or more tubes are secured in heat exchange relationship along the exterior of the freeze cylinder. Cartridge type heating elements are releasably insertable into the tubes to provide for defrosting of the beverage in the freeze cylinder.

U.S. Pat. Nos. 6,163,095, 8,196,423, 9,062,902, and 9,328,948 further relate to frozen carbonated beverage dispensing systems and various improvements thereto.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of the present disclosure generally relates to a system for dispensing a frozen beverage. The system includes a barrel having an inner wall and being configured to retain the frozen beverage therein. A mixing system causes mixing of the frozen beverage within the barrel. A cooling system cools the frozen beverage from radially outwardly of the inner wall. A melting system heats the frozen beverage from radially inwardly of the inner wall. The mixing system causes relatively larger ice crystals to move inwardly from the inner wall, and the melting system reduces a size of the relatively larger ice crystals.

Another embodiment generally relates to a method for melting a frozen beverage within a frozen beverage dispenser, where the frozen beverage being contained within inner walls of a barrel. The method includes mixing the frozen beverage within the barrel via a mixing system, where the mixing system causes relatively larger ice crystals to move inwardly from the inner wall. The method further includes controlling a cooling system to cool the frozen beverage from radially outwardly of the inner wall, and controlling a melting system to alternate between on and off states, where the melting system heats the frozen beverage from radially inwardly of the inner wall only in the on state, and where the melting system reduces a size of the relatively larger ice crystals.

Another embodiment generally relates to a system for dispensing a frozen beverage. The system includes a barrel having an inner wall extending between a front and a back and being configured to retain the frozen beverage therein. A mixing system causes mixing of the frozen beverage within the barrel, where the mixing system includes a beater bar rotatable within the barrel that when rotated causes the frozen beverage to flow from the front of the barrel towards the back along the beater bar and to flow from the back of the barrel towards the front along the inner wall of the barrel. A cooling system cools the frozen beverage from radially outwardly of the inner wall. A melting system heats the frozen beverage from radially inwardly of the inner wall. A control system controls the melting system to alternate between on and off states, where the frozen beverage is heated by the melting system only in the on state, where the mixing system causes relatively larger ice crystals to move inwardly from the inner wall, and where the melting system reduces a size of the relatively larger ice crystals.

Various other features, objects and advantages of the disclosure will be made apparent from the following description taken together with the drawings.

BRIEF DESCRIPTION OF THE DRAWINGS

The drawings illustrate embodiments for carrying out the disclosure. The same numbers are used throughout the drawings to reference like features and like components. In the drawings:

FIG. 9 is a side view of a barrel incorporating a heated grill according to the present disclosure; and FIG. 10-11B are side views of barrels incorporating remote heating according to the present disclosure.

DETAILED DISCLOSURE

This written description uses examples to disclose embodiments of the present disclosure and also to enable any person skilled in the art to practice or make and use the same. The patentable scope of the invention is defined by the potential claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Figure 1:
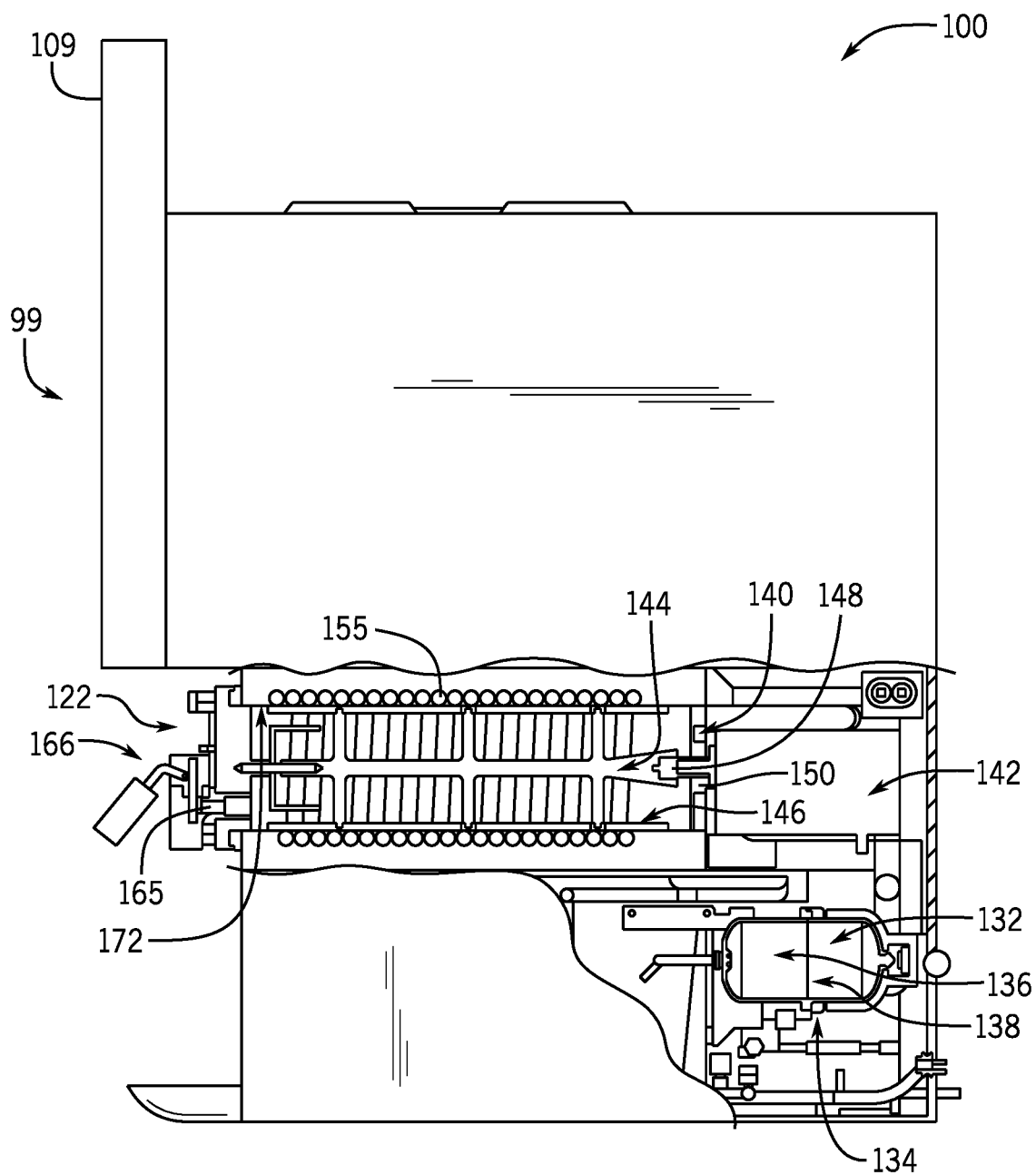
FIG. 1 is a sectional side view of an exemplary frozen carbonated beverage system according to the present disclosure.
Figure 2:
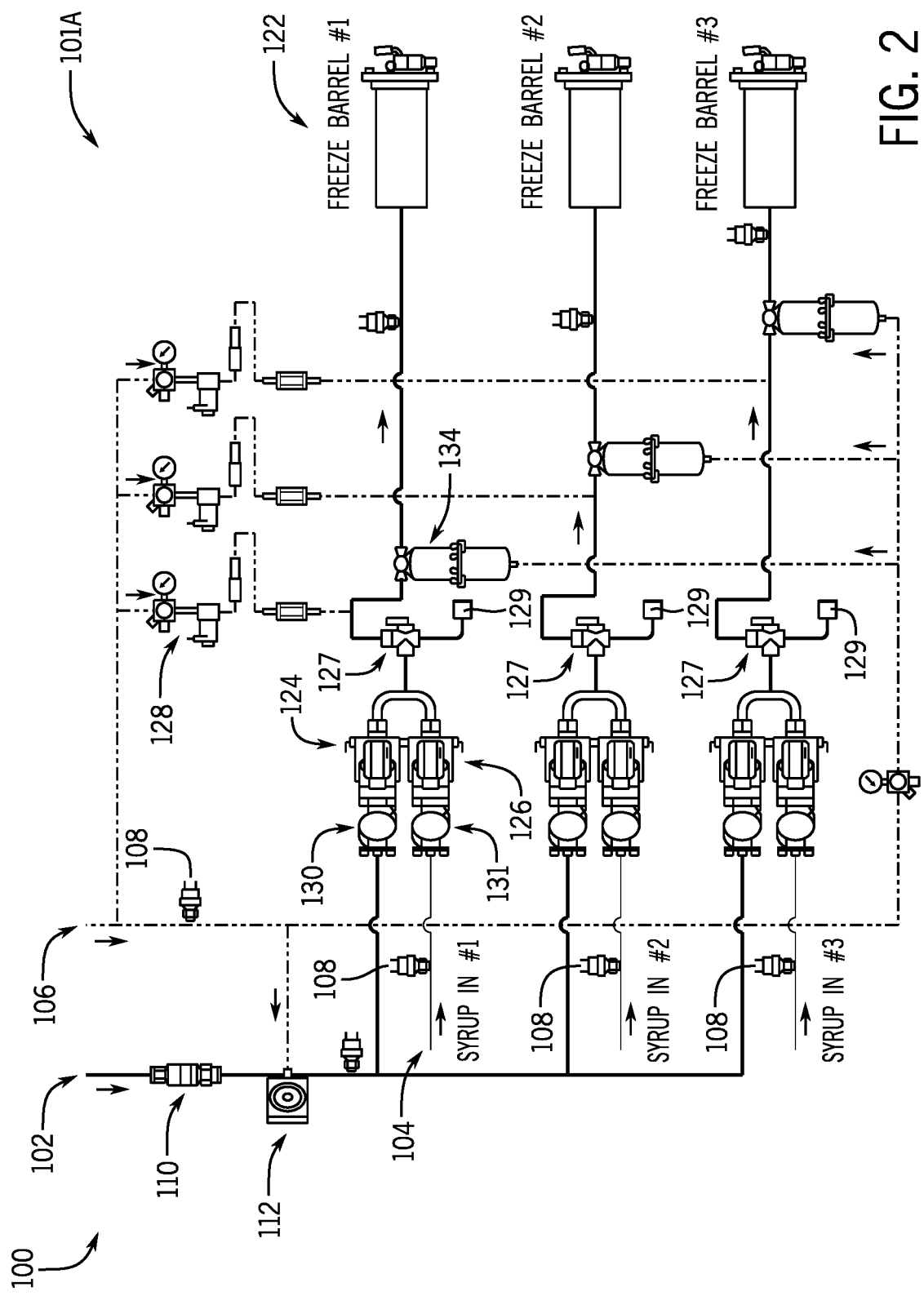
FIGS. 2 and 3 depict schematic views of exemplary beverage production and refrigeration systems for frozen carbonated beverage systems according to the present disclosure, respectively.
Figure 3:
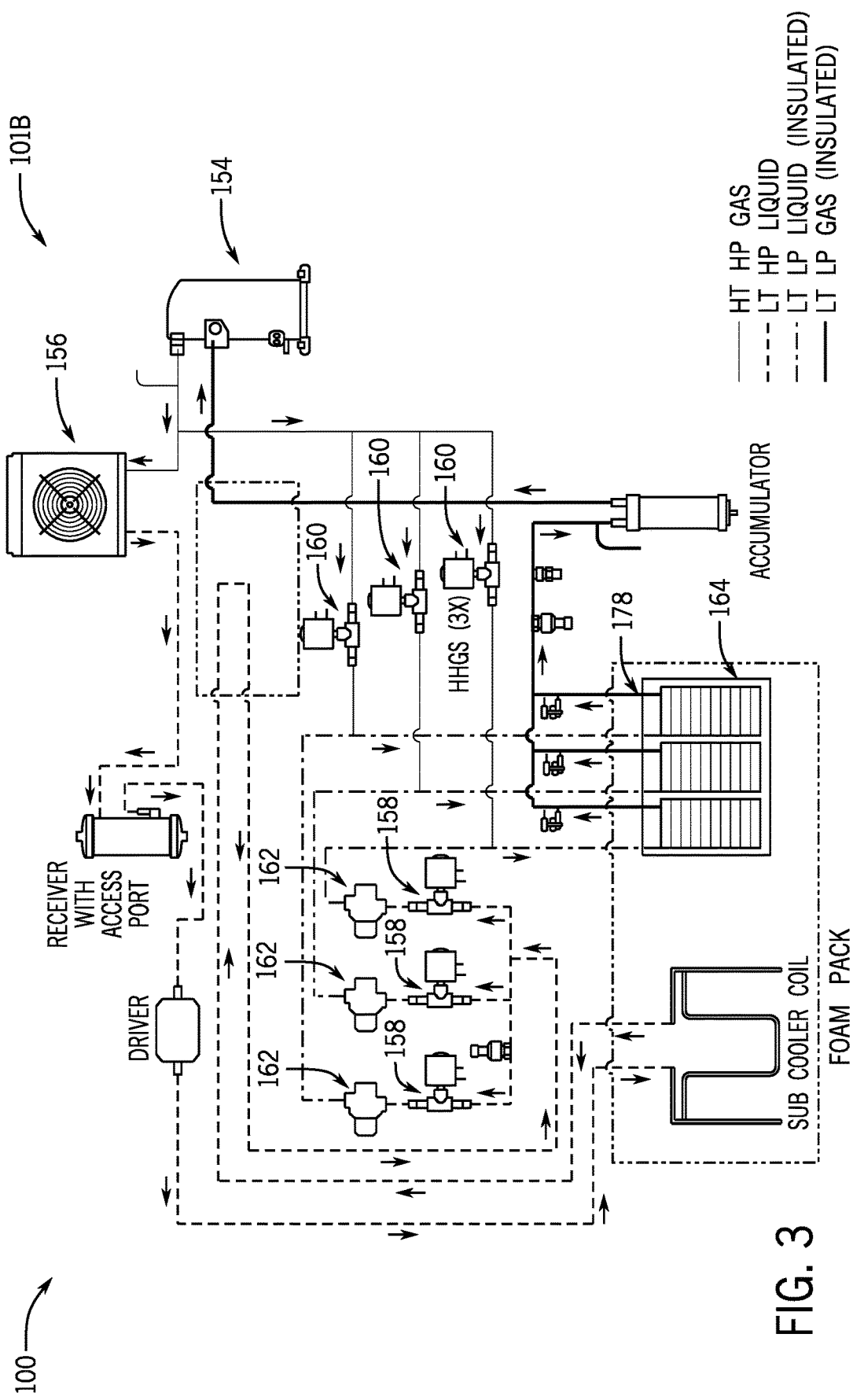

The present disclosure generally relates to systems and methods for dispensing frozen carbonated beverages (FCBs), such as may be offered at a food or beverage service provider, a convenience store, or the like. It should be recognized that the presently disclosed systems and methods also apply to non-carbonated frozen beverages and food products, for example. An exemplary system 100 for producing and dispensing FCBs according to the present disclosure is shown in FIGS. 1-3. FIG. 1 shows an exemplary dispensing machine 99, which prepares and stores a beverage within a barrel 122 that extends from a back 94 to a front 92. A front plate 90 is coupled to the front 92 and includes a dispenser valve 166 for dispensing the frozen product from the barrel 122. In certain examples, selections for the beverage to be dispensed are made using a user interface 109. The content within the barrel 122 is cooled (or heated) based on the temperature of fluid flowing through the heat transfer coil 155 substantially encircling the outer perimeter of the barrel 122 in a conventional manner.

A motor 142 rotates a beater bar 144 and scraper blades 146 attached thereto, which are also collectively referred to as a mixing system. In systems 100 known in the art, the beater bar 144 is rotated at a fixed speed (i.e., 168 RPM). The motor 142 is coupled to the beater bar 144 via a motor coupling shaft 148 that passes through a rotary barrel seal 150. An expansion tank 134 is also provided between supply lines 107 and a barrel inlet 140 defined within the barrel 122. The power required for the motor 142 to rotate the beater bar 144 and the scraper blades 146 through the mixture contained within the barrel 122 is monitored by a control system 600 (FIG. 6, discussed below) having a processing system 610 and memory system 630. This power consumption is then used to estimate the viscosity of product within the barrel 122.

The system 100 includes a beverage production system 101A (FIG. 2) and a refrigeration system 101B (FIG. 3). In the beverage production system 101A of FIG. 2, pressurized water 102, syrup concentrate 104, and CO2 106 (collectively, supply lines 107) are supplied to the system 100. Pressures are monitored by "sold out" pressure switches 108 connected to each of the supply lines 107. The pressure of the water 102 entering the system 100 is controlled by reducing the pressure through a regulator 110, then increasing the pressure with a CO2 powered pump 112 to yield a consistent and known final pressure. The pressure provided by this CO2 powered pump 112 is a function of inlet CO2 pressure.

In a similar manner, pressure for the syrup concentrate 104 is supplied by a CO2 powered pump 114, whereby pressure is again provided as a function of inlet CO2 pressure as controlled by a regulator. The resulting pressure of syrup concentrate 104 at the dispensing machine 99 (FIG. 1) is a function of the pressure provided by the CO2 powered pump 114, the distance in elevation between the pump 114 and the dispensing machine 99, tubing diameters for the supply lines 107, syrup concentrate 104 viscosity, the number of splices or joints in the supply lines 107, and other factors.

Continuing with FIG. 2, the pressure of incoming CO2 106 is controlled by a regulator, which for certain systems 100 is set at 75 psig. Supply pressures may drop for multiple reasons. Since all supply lines 107 may incorporate the use of CO2 106 as described above (i.e., via CO2 powered pumps 112 and 114), a reduction in CO2 106 supply pressure can affect all supply lines 107. This can occur when the contents of the CO2 106 tank are depleted, when there is an increased draw on the CO2 106 tank from other dispensing machines 99 or other devices sharing common CO2 106, or an increased draw from a single dispensing machines 99, such as if multiple barrels 122 are filled simultaneously as part of a standard maintenance activity, for example.

Figure 4:
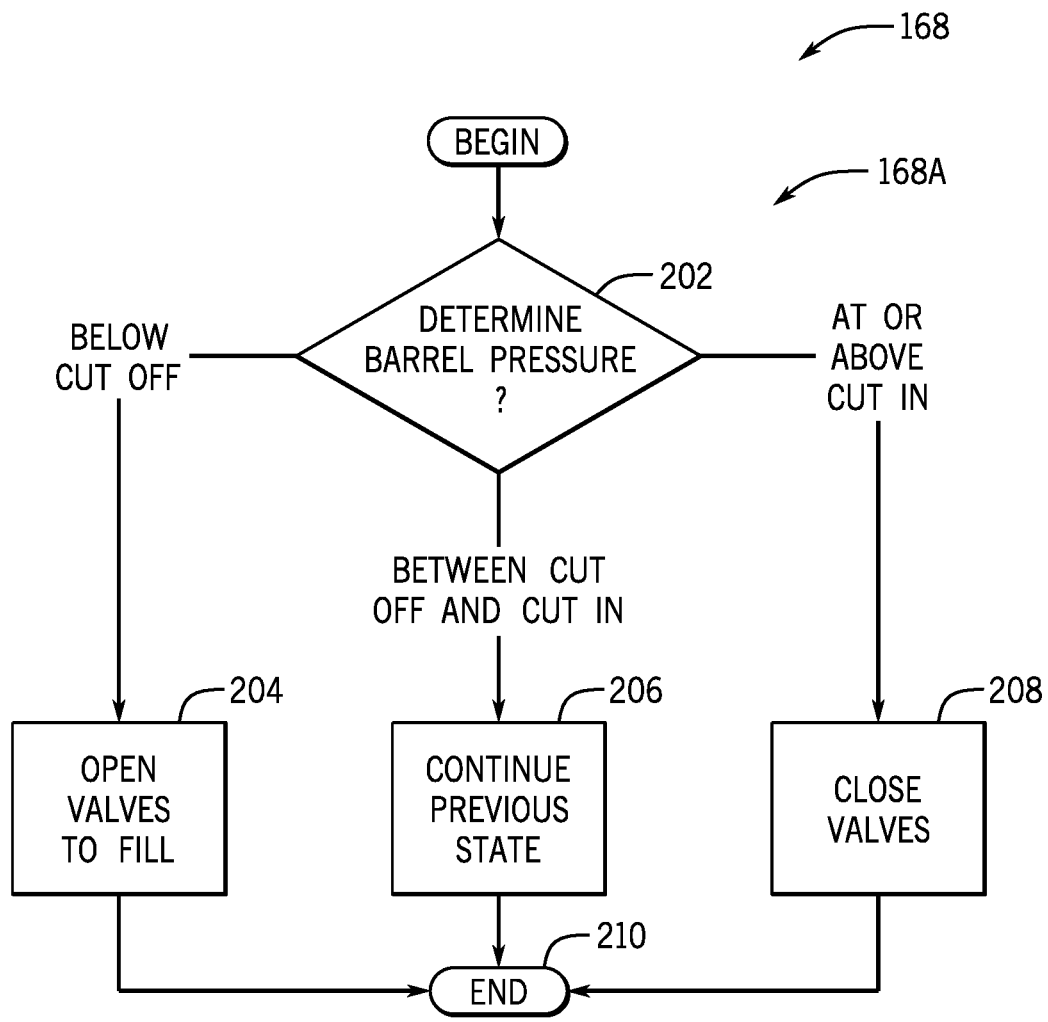
FIG. 4 depicts an exemplary process flow for filling a frozen carbonated beverage system according to the present disclosure.

When one of the supply lines 107 is depleted, the pressure of that supply line 107 will drop below a "cut off" pressure as read by a pressure switch 108. A control system 600 (FIG. 6) receives inputs from the pressure switch 108 and compares these pressure values to "cut in" and "cut off" values. If the pressure is below the "cut off" pressure, the control system determines that the supply is "sold out." The control system 600 then signals the need for the supply to be replenished until the supply pressure is determined to be above a "cut in" pressure as read by the pressure switch 108. When the control system 600 determines that the pressure of the supply line 107 has surpassed the cut in pressure, the control system will no longer indicate that the supply line 107 is "sold out." The fill process 168 for this beverage production system 101A (FIG. 2) is shown in FIG. 4, which is discussed further below.

Figure 6:
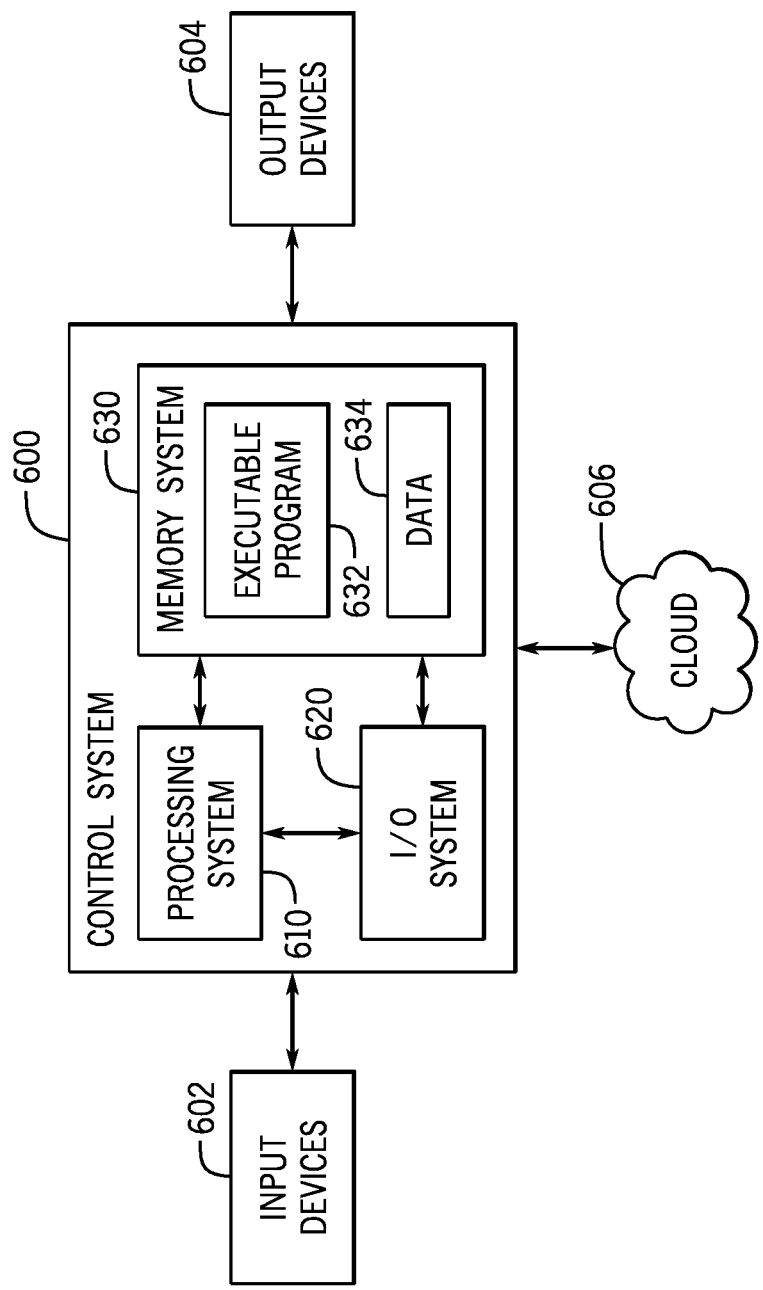
FIG. 6 depicts an exemplary control system for operating a frozen carbonated beverage system according to the present disclosure.

FIG. 6 depicts an exemplary control system 600 for operating a system 100 according to the present disclosure. The control system 600 communicates with input devices 602 (which may include pressure switches 108, for example), output devices 604 (such as the water valves 124), and/or a cloud 606 based network. In the exemplary control system 600 shown, an input/output (I/O) system 620 provides communication between the control system 600 and the input devices 602, output devices 604, and cloud 606, which may each be bidirectional in nature. A processing system 610 within the control system 600 is configured to execute information received from the I/O system 620 and also from the memory system 630. In the example shown, the memory system 630 includes an executable program 632 for operating the control system 600 and the system 100 more generally, as well as a data 634 module for storing such parameters as cut in and cut off pressures, as discussed above.

It should be recognized that certain aspects of the present disclosure are described and depicted, including within FIG. 6, in terms of functional and/or logical block components and various processing steps. It should be recognized that any such functional and/or block components and processing steps may be realized by any number of hardware, software, and/or firmware components configured to perform the specified functions. For example, certain embodiments employ various integrated circuit components, such as memory elements, digital signal processing elements, logic elements, look-up tables, or the like, which are configured to carry out a variety of functions under the control of one or more processors or other control devices. The connections between functional and logical block components are also merely exemplary. Moreover, the present disclosure anticipates communication among and between such components being wired, wireless, and through different pathways These functions may also include the use of computer programs that include processor-executable instructions, which may be stored on a non-transitory tangible computer readable medium. The computer programs may also include stored data. Non-limiting examples of the non-transitory tangible computer readable medium are nonvolatile memory, magnetic storage, and optical storage. As used herein, the term module may refer to, be part of, or include an application-specific integrated circuit (ASIC), an electronic circuit, a combinational logic circuit, a field programmable gate array (FPGA), a processor system (shared, dedicated, or group) that executes code, or other suitable components that provide the described functionality, or a combination of some or all of the above, such as in a system-on-chip. The term module may include memory (shared, dedicated, or group) that stores code executed by the processor. The term code, as used herein, may include software, firmware, and/or microcode, and may refer to programs, routines, functions, classes, and/or objects. The term shared, as used above, means that some or all code from multiple modules may be executed using a single (shared) processor. In addition, some or all code to be executed by multiple different processors as a computer system may be stored by a single (shared) memory. The term group, as used above, means that some or all code comprising part of a single module may be executed using a group of processors. Likewise, some or all code comprising a single module may be stored using a group of memories as a memory system.

Furthermore, certain elements are shown as singular devices for the sake of clarity, but may be combined or subdivided differently to perform the same function. For example, the processing system 610 may represent a single microprocessor, or a group of microprocessors functioning as a system. This also applies to the input/output (I/O) system 620 and memory system 630, which may also store information therein in greater or fewer groupings than is shown.

As shown in FIG. 4, the control system 600 determines the barrel 122 pressure in step 202 via inputs received from the pressure switch 108. The control system 600 then compares the barrel 122 pressure to the cut in and cut off values previous described. If the control system 600 determines that the pressure is below the cut off value, the control system 600 signals for the barrel 122 to be filled. To fill the barrel 122, the water valves 124, syrup valves 126, and $CO_2$ valves 128 are opened to allow water, syrup concentrate, and $CO_2$ to simultaneously flow into the barrel 122 together. The water 102 and syrup concentrate 104 are generally kept at a consistent ratio, set by manually adjusting water flow controls 130 and syrup concentrate flow controls 131. For beverage systems known in the art, water valves 124 and syrup valves 126 are controlled in tandem. Depending on the required amount of $CO_2$, the $CO_2$ valve 128 may open fully when the water valves 124 and syrup valves 126 are opened, or may open intermittently, such as via a specified duty cycle.

The water 102, syrup concentrate 104, and $CO_2$ 106 pass through the liquid side 132 of an expansion tank 134. The expansion tank 134 is pressurized on the gas side 136 of an internal diaphragm 138, which allows for expansion of the liquid contents of the machine during freezing without damaging the rest of the rigid components within the machine. Liquid product then enters the barrel 122 through a barrel inlet 140 (FIG. 1).

Continuing with reference to FIGS. 2 and 4, the state of the fill process 168 continues in step 206 (whether filling or not filling) as long as the barrel 122 pressure is between the cut in and cut off values. However, if the pressure in the barrel 122 is determined to be at or above the cut in value in step 208, the water valves 124, syrup valves 126, and $CO_2$ valves 128 are all closed to stop the fill process 168 in step 210.

Figure 5:
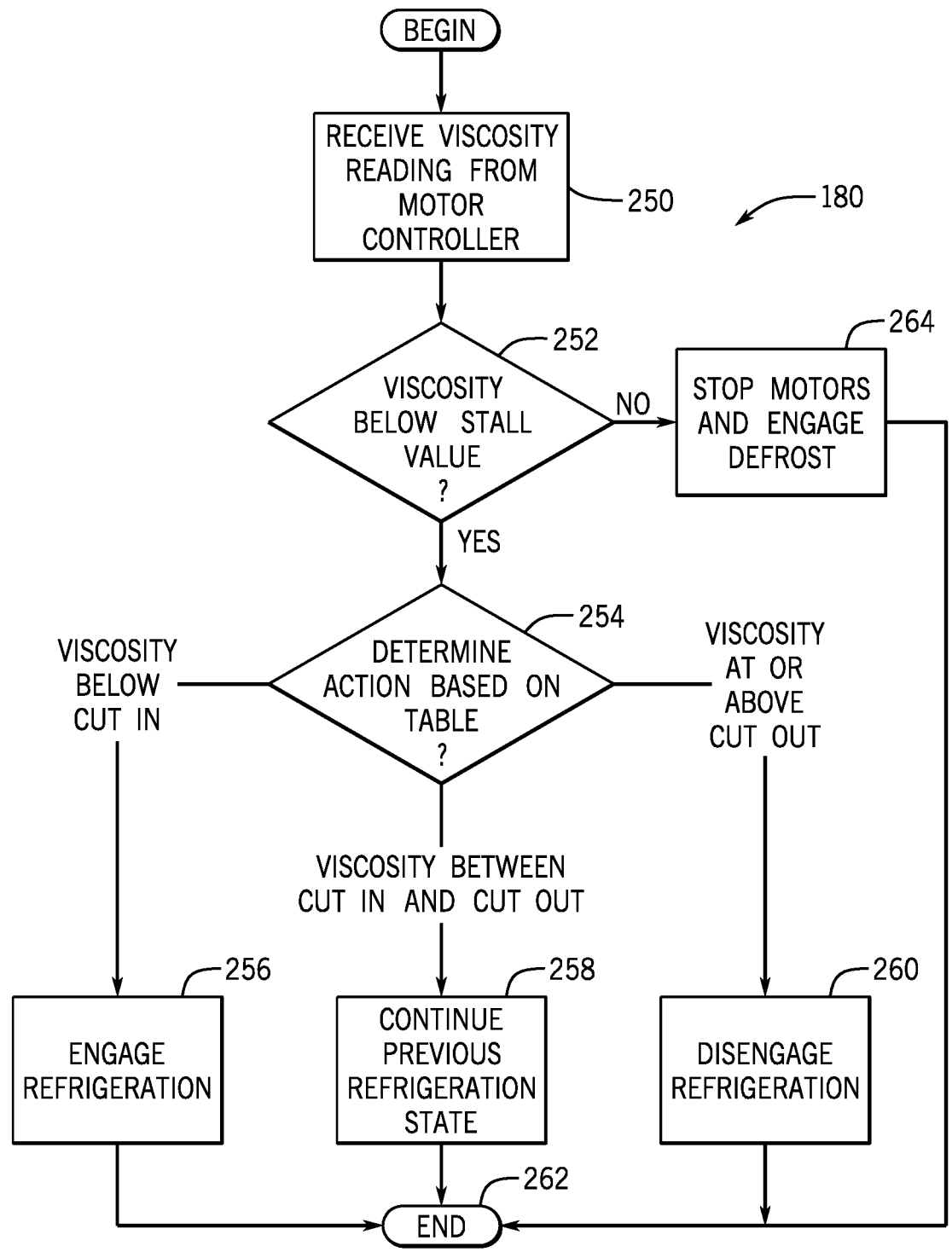
FIG. 5 depicts an exemplary process flow for refrigerating a frozen carbonated beverage system according to the present disclosure.

A similar control process occurs with respect to the refrigeration system 101B (FIG. 3), which is shown in the refrigeration process 180 of FIG. 5. In particular, the viscosity of contents in the barrel 122 is used to determine whether the beverage requires more, less, or the same refrigeration at any given time. The viscosity is determined based on the power required by the motor 142, which is read in step 250. The control system 600 (FIG. 6) then determines whether the viscosity falls below a stall value in step 252, based on comparison to a table stored within the data 634 of the memory system 630. If the viscosity is found to be greater than the stall value in step 252, the motor 142 is stopped in step 264 and a defrost process is started to melt the excessive ice causing the excessive viscosity within the barrel 122, ending at step 262.

If alternatively the viscosity is determined in step 252 to be below the stall value, the process continues with determining an action in step 254 based on whether the viscosity is below, above, or between cut in and cut out values (also stored in the data 634 of the memory system 630). If it is determined in step 254 that the viscosity is below the cut in value (meaning low), refrigeration is engaged in step 256, freezing additional content within the barrel 122 to increase the viscosity therein. If alternatively the viscosity is above a stored cut out value, refrigeration is discontinued in step 260 to prevent a further increase in viscosity. Finally, if the viscosity is determined in step 256 to be between the cut in and cut out values, the refrigeration process 180 continues the previous refrigeration step 258 and the process is repeated.

As shown in FIG. 3, the refrigeration system 101B includes a compressor 154 and condenser 156 for the system 100, as well as liquid line solenoid valves 158, hot gas solenoid valves 160, and expansion valves 162 for each barrel evaporator 164. In this manner, the system 100 may supply refrigeration or heat to each barrel 122 independently. In freeze mode, the refrigeration system 101B draws heat out of the barrel 122 through the evaporator until the viscosity of the product meets a specified cut out value, as discussed above. As beverages are dispensed, product is pushed out of the dispense valve 166 (FIG. 1) by pressure within the barrel 122. As the barrel 122 pressure drops below a specified minimum fill pressure, the fill process 168 (FIG. 4) resumes until barrel 122 pressure reaches a specified maximum fill pressure. During the fill process 168, liquid product enters the barrel 122 at ambient temperature through a barrel inlet 140 (FIG. 1). Heat therefore enters the barrel 122 through conduction and friction. As previously stated, the viscosity of the product decreases until it meets a specified cut in value, caused by this heat, until refrigeration begins again.

Figure 7:
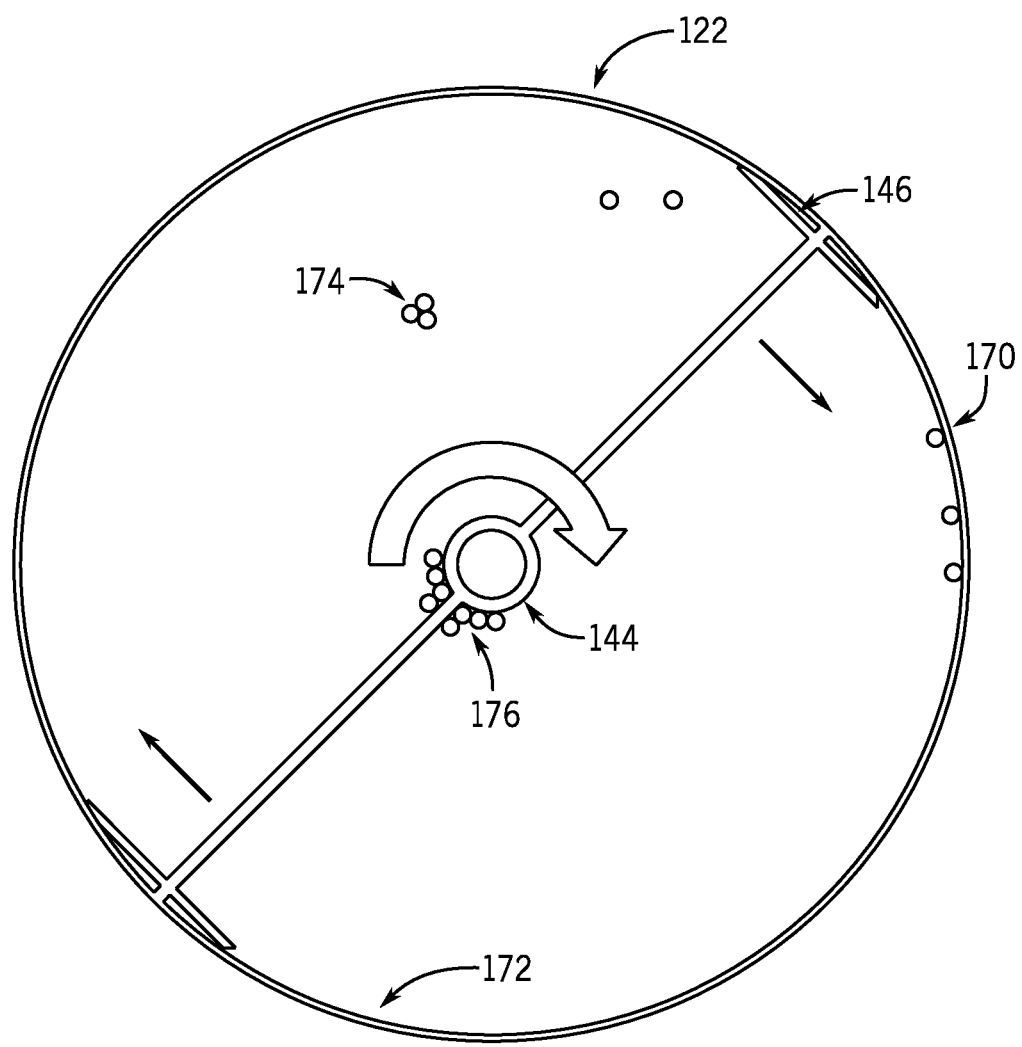
FIG. 7 is a front view of an exemplary barrel for a system according to the present disclosure.

As shown in FIG. 7, during the refrigeration process 180 previously discussed, ice crystals 170 form on the inside wall 172 of the barrel 122 (FIG. 1), which are scraped off the inside wall 172 by the scraper blades 146 coupled via supports 145 to the beater bar 144. The present inventors have identified through experimentation and research that over time and through multiple refrigeration cycles, the ice crystals 170 in the barrel 122 grow in size and stick together to form larger ice crystals 174 and large ice formations 176, degrading the smooth texture of the drink produced by the system 100. As the barrel 122 contents rotate, higher density components are driven towards the perimeter of the barrel 122 via centripetal force, likewise forcing lower density components (such as the larger ice crystals 174 and large ice formations 176) towards the center of the barrel 122. This in turn results in larger formations of ice 176 surrounding the beater bar 144, leading to undesirable and/or inconsistent product.

After a specified time, the barrel 122 enters a defrost cycle where heat is added to the barrel 122 through the heat transfer coil 155 via the barrel evaporator 164 (FIG. 3) for a set duration, or until the temperature of the evaporator outlet 178 reaches a specified temperature. In certain examples, the intention of this defrost cycle is to fully melt all product in the barrel 122. From there, the refrigeration process 180 begins again until the viscosity of the product meets a specified cut out value, as discussed with respect to the process flow of FIG. 5.

The present inventors have identified that FCB systems presently known in the art are prone to several types of problems. For example, a problem arises when the pressure in a supply line 107 (such as water 102, syrup concentrate 104, or CO2 106) falls below a specified value. In this case, the dispensing machine 99 in certain systems 100 will disable the fill process 168 to prevent an improper mix of ingredients from entering the barrel 122. Likewise, problems arise when the viscosity of the barrel 122 exceeds a specified safety value intended to prevent damage to the system 100. In this case, the motor 142 is typically disabled and a defrost cycle begins to melt the excess ice that is presumed to be building up within the barrel 122.

The present disclosure further relates to improved systems and methods for controlling the size of ice crystals in a frozen beverage products. In particular, the freezing and defrost cycles for FCB systems presently known in the art require frequent down time, and consequently a loss of beverage sales for system owners. As discussed above, systems presently known in the art conduct defrost cycles at a fixed interval, such as a certain period of time (for example, every 3 hours).

The current process for defrosting in systems known in the art is to control the size of ice crystals 170 by fully melting the contents of the barrel 122 to an entirely liquid, baseline state, then refreezing it. The inventors have identified that this has multiple disadvantages. First, the resultant product within the barrel 122 after the defrost cycle is not at the desired consistency, but must be refrozen as discussed above. Moreover, both the defrost cycle and refreezing cycle are energy-intensive processes. Additionally, acceptable beverages cannot be dispensed during at least the defrost cycle, resulting in lost sales from downtime. To minimize the duration of the defrost cycle, the full capacity of the compressor 154 (FIG. 1) is dedicated to defrosting a single barrel 122, whereas multiple barrels 122 may be present within the system 100. Any diversional of this capacity to defrost multiple barrels 122 in tandem, or to continue refrigeration of other barrels 122 during this process, extends the duration of the defrost cycle and thereby increases the amount of time that a given barrel 122 is not available to dispense beverages.

Furthermore, in configurations that incorporate a remote condenser serving multiple FCB systems and/or other products, it is traditional to mount the compressor and condenser in a remote location to minimize the amount of heat and noise thereby produced. However, systems presently known in the art use hot gas for the defrost cycle, which preferences the compressor being inside the system. This reduces the opportunities for smaller, quieter equipment. This also creates the risk that, in error conditions, the contents of the barrel may be heated to dangerous temperatures, requiring further complication for additional safety measures.

The inventors have identified that with systems presently known in the art, the size of the ice formation is inconsistent within the barrel. The inventors further identified that this inconsistency is caused and/or exacerbated by treating and monitoring the contents within the barrel as if this content were uniform. Through experimentation and research, the inventors have developed the presently disclosed systems and methods for improving consistency within the barrel 122. In general, these systems and methods relate to melting the largest pieces of ice formed within the barrel 122 of the system 100, providing uniformity and the desired consistency for product being dispensed.

With reference to FIG. 7, the inventors have identified that over time, ice crystals 170 (FIG. 7) coalesce and become larger ice crystals 174 and eventually larger formations of ice 176. This growth is influenced by several factors, including the composition of the content within the barrel 122 (such as the percent sugar), the temperature inside the barrel 122, the frequency and/or volume of drinks being dispensed from the barrel 122 and subsequently replaced by unfrozen product, the temperature of the unfrozen product entering the barrel 122, and/or the speed of rotation of the barrel 122 being agitated by an agitator or beater bar 144, for example. As discussed above, rotation of the barrel 122 over time causes higher density components (e.g., syrup concentrate 104) to migrate towards the inside wall 172 of the barrel 122, and lower density components (i.e., ice crystals 170) towards the center of the barrel 122, surrounding the beater bar 144. This separation may be further impacted by the surface finish, material, or the geometry of the beater bar 144, inside wall 172, and/or other characteristics of the barrel 122 generally.

FIGS. 8A-11B depict various embodiments of systems 100 according to the present disclosure for improving the defrost cycle and, likewise, the consistency of the content within the barrel 122. A first family of solutions generally relates to heating of the beater bar 144, since the lower density ice crystals 170 migrate towards the beater bar 144 as previously described. In particular, the present inventors have identified that the ice crystals 170 surrounding the beater bar 144 can be melted by heating the beater bar 144. As the ice crystals 170 melt, their corresponding densities increase. This allows the now-melted content to migrate away from the beater bar 144 upon further rotation, subsequently being replaced by lower density ice crystals 170 for the process to repeat. The defrost cycle is controlled by the control system 600 (FIG. 6) in the manner previously described, which may operate based on time intervals, temperatures at one or more locations within the barrel 122, viscosity readings at one or more locations within the barrel 122, or combinations thereof.

Figure 8A:
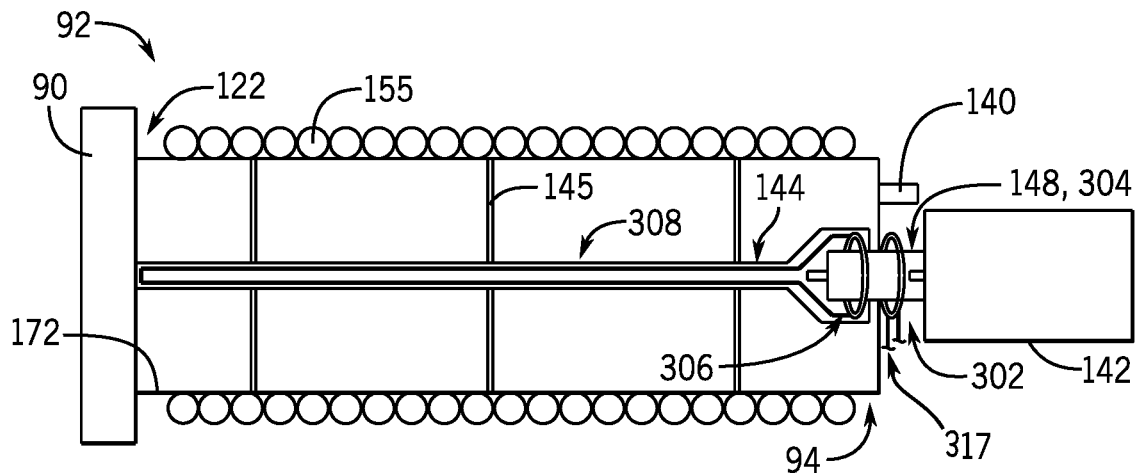
FIGS. 8A-8C are side views of barrels incorporating embodiments of heated beater bars according to the present disclosure.
Figure 8B:
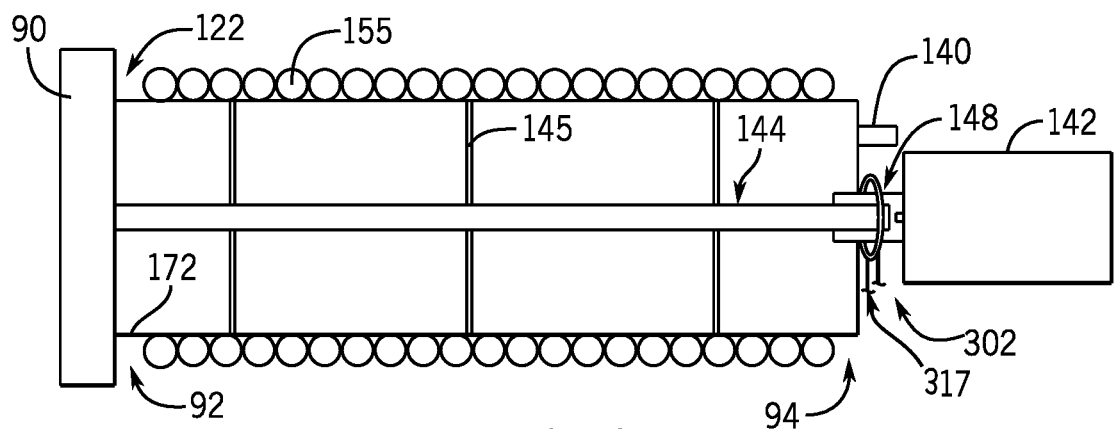
Figure 8C:
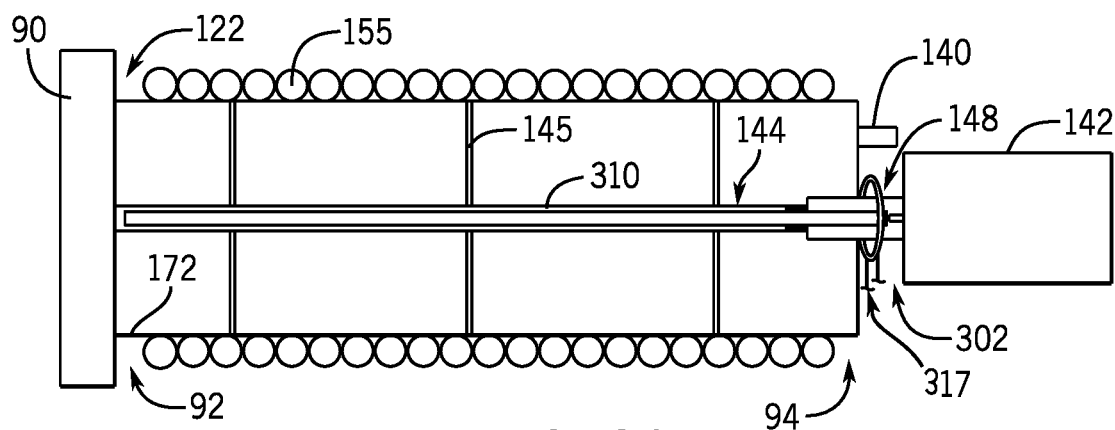

FIGS. 8A-8C depict various embodiments for heating the beater bar 144 to accomplish this targeted melting process. In the embodiment of FIG. 8A, the beater bar 144 is heated via inductive power provided to heating elements therein. As shown, a first fixed coil 302 is coupled to an electrical source (not shown) within the system 100, whereby the fixed coil 302 is located coaxially around a core 304. The core 304 (which may also be the motor coupling shaft 148 of FIG. 1) includes a second rotating coil 306 that is coupled to heating elements 308 within the beater bar 144. In this manner, when alternating current (AC) is supplied to the fixed coil 302, it induces AC current in the rotating coil 306 to thereby power the heating elements 308. These heating elements 308 may be embedded in a cast or molded beater bar 144, or applied over the surface of an otherwise known beater bar 144, for example. This in turn melts the ice crystals 170 surrounding the beater bar 144 as previously discussed. In this manner, the embodiment of FIG. 8A heats the beater bar 144 by functioning as a transformer.

FIG. 8B shows an alternate embodiment for heating of the beater bar 144. In this embodiment, the beater bar 144 itself is heated through induction. A first fixed coil 302 is coupled to an electrical source (not shown) in the system 100 and is again located coaxially around the beater bar 144 in the same manner discussed above. However, in this embodiment, the beater bar 144 is or contains metal such that it is heated when the fixed coil 302 is energized. In this manner, the embodiment of FIG. 8B heats the beater bar 144 by functioning as an induction heater.

FIG. 8C discloses a third embodiment for heating the beater bar 144 according to the present disclosure. In the example shown, the heating element 310 is provided as a fixed core that is received within the center of the beater bar 144. In certain examples, the heating element 310 is fixed relative to the system 100 and is heated by a fixed coil 302 in the manner previously described. The heat from the heating element 310 then radiates outwardly to the beater bar 144 to accomplish the localized melting of ice crystals 170 desired.

FIG. 9 discloses an alternate type of embodiment that incorporates a heated grill 314 for melting ice crystals 170, and specifically larger ice crystals 174 or larger formations of ice 176 (FIG. 7). In the example shown, a flow pattern for the product is produced between the front 92 and the back 94 of the barrel 122 through the addition of blades 312 or other elements associated with beater bar 144 and/or inside wall 172. In the example of FIG. 9, this flow provides for movement from the front 92 to the back 94 closer to the beater bar 144, and from the back 94 to the front 92 closer to the inside wall 172 of the barrel 122.

The grill 314 in the present embodiment is a coil of individual wires 315 coupled via connections 317 to a power source (not shown) to be heated, for example as a resistance based heater. The grill 314 in certain embodiments is similar to that of a conventional electric stove heating element, for example. The individual wires 315 are coiled to form a gap G therebetween (which may vary or be the same across the grill 314). The grill has an inner diameter ID and an outer diameter OD, which in the example of FIG. 9 is smaller than a barrel diameter BD within the inner walls 172 of the barrel 122. As the product flows through the barrel 122, the grill 314 is positioned within the barrel 122 to capture larger ice crystals 174 above a specified size, consequently melting them. Specifically, the size of ice captured is selected based on the size of the gap G between individual wires 315. In certain examples, the grill 314 is positioned near the rear of the barrel 122. This grill 314 may be a heating element itself, or may retain the larger ice crystals 174 in proximity to a separate heating element (not shown). Melted product 316 then passes along the inside wall 172 of the barrel 122, which subsequently refreezes as it proceeds towards the front 92 of the barrel 122. By the time the product reaches the front 92 of the barrel 122, it is optimally once again frozen product 318 ready for dispensing.

FIGS. 10-11B depict another type of embodiment for melting larger ice crystals 174, generally relating to a process of remote heating. Specifically, product may be forced to flow out of the barrel 122, where it is melted and reintroduced to freeze again within the barrel 122. As will be discussed further below, this may be accomplished as a continuous process, or as a cyclical or periodic process. The frequency and/or intensity of the process may be governed by various parameters, including the present operational state and/or settings of the system 100 (i.e., freezing, defrosting, etc.), the volume of beverage dispensed over a period of time, and the like.

FIG. 10 shows a first type of remote heating that includes a recirculating melt circuit 301. Product is driven out of the barrel 122 via a barrel outlet 141 and into the circuit 301, where it is melted and returned back to the barrel 122 via a barrel inlet 140. This product may be driven through the circuit 301 by the flow 320 caused by the beater bar 144, and/or by a separate pump 322, for example. Once the product exits the barrel 122, it is either partially melted (such as with a grill 314 or other heat device, and/or a filter designed to capture ice crystals 170 of a certain size), or be fully melted. Heat may be provided within the circuit 201 using the heat generated by the system 100 itself (such as from the motor 142, condenser 156, or other components within the system 100), or with separate heating elements. For example, a heat transfer region 303 of the circuit 301 may be positioned to transfer heat from the motor 142. In certain examples, heat may also or alternatively be provided by running the circuit 301 such that a heat exchange occurs with warmer, unfrozen product. This provides the added benefit of also pre-cooling the liquid product used to fill the barrel 122 as beverages are dispensed.

In addition to selectively melting content within the barrel 122, the inventors have further identified that by holding some portion of chilled product outside of the barrel 122, additional capacity is realized for the overall system 100.

FIGS. 11A and 11B depict another embodiment providing remote heating for defrosting content within the barrel 122 according to the present disclosure. In the example shown, a cyclical melt is provided by drawing a volume of product out of the barrel 122 via the barrel outlet 141, melting this volume, and then reintroducing the product to the barrel 122 to once again be refrozen (which may again be via the barrel outlet). In the example shown, a piston 324 is used to draw the product out of the barrel 122, though other methods may be employed. In one embodiment, one side of a heat cylinder 334 is fluidly coupled to the barrel 122, with the other side of the cylinder 334 being coupled via a three-way valve 326 to both a source of pressurized gas on the gas side 328 and to a vent 330 to atmosphere. A piston 324 is moveable within the heat cylinder 334 via pressure differential in a manner known in the art, for example.

In the embodiment shown, the gas side 328 of the cylinder 334 is vented to atmosphere to allow the pressure of the barrel 122 to drive the frozen product 332 to the product side of the cylinder 338 (FIG. 11A). The product is then heated via a separate heating element as would be commercially available, and/or via heat transfer with the motor 142 and/or other elements, causing at least a partial melt thereof. After the product has been at least partially melted, the gas side 328 of the cylinder 334 is repressurized to the operating pressure of the barrel 122 such that the product is returned as liquid cylinder contents 340 back into the barrel 122 (FIG. 11B). In alternate embodiments, a plurality of cylinders 334 may be utilized to cycle the product through the melting cycle process without any dispensing or filling of the barrel 122.

The present inventors have further identified that the embodiment of FIGS. 11A-11B offers the additional benefit of incorporating a variable volume storage reservoir, which has the potential for concurrently serving the purposes of the expansion tank 134 (FIG. 1) previously discussed. In this manner, the expansion tank 134 could be eliminated from the system 100, thereby reducing further expenses for implementing the presently disclosed systems and methods.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other devices. It is to be expected that various equivalents, alternatives and modifications are possible within the scope of any appended claims.

What is claimed is:

1. A system for dispensing a frozen beverage, the system comprising:
    a barrel configured to retain the frozen beverage therein;
    a cooling system that cools the frozen beverage;
    a heating circuit fluidly coupled to the barrel such that a portion of the frozen beverage exits the barrel and flows through the heating circuit before reentering the barrel, wherein a motor fluidly coupled within the heating circuit to act upon the portion of the frozen beverage therein; and
    a melting system that heats the portion of the frozen beverage while the portion of the frozen beverage is in the heating circuit, the melting system providing the heat for the portion of the frozen beverage other than via the motor within the heating circuit.

2. The system according to claim 1, wherein the barrel extends between a front and a back with sides therebetween, wherein the frozen beverage is dispensable from the front of the barrel, and wherein the frozen beverage exits the barrel on a same one of the front, the back, and the sides that the frozen beverage reenters the barrel after being heated by the melting system.

3. The system according to claim 1, wherein the barrel extends between a front and a back, wherein the frozen beverage is dispensable from the front of the barrel, and wherein the frozen beverage reenters the barrel horizontally closer to the back than to the front.

4. The system according to claim 3, wherein the frozen beverage exits the barrel horizontally closer to the back than to the front.

5. The system according to claim 1, wherein the frozen beverage reenters the barrel vertically higher than where the frozen beverage exits the barrel to be heated by the melting system.

6. The system according to claim 1, wherein the barrel extends between a front and a back, wherein the frozen beverage is dispensable from the front of the barrel, and wherein the frozen beverage is heated by the melting system horizontally behind the back of the barrel so as to be heated farther from the front of the barrel than from the back of the barrel.

7. The system according to claim 1, wherein the motor within the heating circuit is a first motor, further comprising a second motor for mixing the frozen beverage within the barrel, wherein the second motor generates heat, and wherein the portion of the frozen beverage is heated via the heat from the second motor.

8. The system according to claim 1, wherein the motor is part of a pump that causes the frozen beverage to flow through the heating circuit.

9. A system for dispensing a frozen beverage, the system comprising:
    a barrel configured to retain the frozen beverage therein;
    a cooling system that cools the frozen beverage; and
    a mixing system that mixes the frozen beverage within the barrel, wherein the mixing system is directly heated via electromagnetic induction so as to heat the frozen beverage while mixing.

10. The system according to claim 9, wherein the mixing system includes a beater bar that rotates within the barrel to mix the frozen beverage.

11. The system according to claim 10, wherein the beater bar is heated via the electromagnetic induction to thereby heat the frozen beverage while mixing.

12. The system according to claim 11, wherein the beater bar is rotated by a motor having a shaft, wherein the electromagnetic induction is provided by powering a coil, and wherein the coil coaxially surrounds the shaft of the motor.

13. A system for dispensing a frozen beverage, the system comprising:
    a barrel configured to retain the frozen beverage therein;
    a cooling system that cools the frozen beverage; and
    a beater bar that mixes the frozen beverage within the barrel, wherein the beater bar comprises a heating element and a first coil, further comprising a second coil configured such that powering the second coil induces a current in the first coil to power the heating element of the beater bar and thereby heat the frozen beverage.

14. The system according to claim 13, wherein the first coil is electrically coupled to the heating element.

15. The system according to claim 13, wherein the first coil is inside the barrel and the second coil is outside the barrel.

16. The system according to claim 11, wherein the beater bar comprises metal, further comprising a coil that encircles a portion of the beater bar and is configured such that powering the coil heats the beater bar directly via the electromagnetic induction.

17. The system according to claim 16, wherein the coil is outside the barrel and is coaxially aligned with the beater bar.

18. A system for dispensing a frozen beverage, the system comprising:
   a barrel configured to retain the frozen beverage therein;
   a cooling system that cools the frozen beverage; and
   a beater bar that mixes the frozen beverage within the barrel, wherein the beater bar comprises a heating element, further comprising a coil that encircles a portion of the beater bar and is configured such that applying electricity to the coil powers the heating element to thereby heat the frozen beverage.

19. The system according to claim 18, wherein the heating element extends within a core inside the beater bar.

20. The system according to claim 18, wherein the coil is outside the barrel and is coaxially aligned with the heating element within the beater bar.

* * * * *